(12) United States Patent
Katayama

(10) Patent No.: US 8,851,552 B2
(45) Date of Patent: Oct. 7, 2014

(54) VEHICLE DOOR

(71) Applicant: Honda Motor Co., Ltd, Tokyo (JP)

(72) Inventor: Youichi Katayama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/946,239

(22) Filed: Jul. 19, 2013

(65) Prior Publication Data

US 2014/0062122 A1    Mar. 6, 2014

(30) Foreign Application Priority Data

Aug. 31, 2012   (JP) .................. 2012-190980

(51) Int. Cl.
*B60J 5/04* (2006.01)
*B60J 10/00* (2006.01)

(52) U.S. Cl.
CPC ............ *B60J 5/0402* (2013.01); *B60J 10/0017* (2013.01)
USPC ..................................... 296/146.2

(58) Field of Classification Search
USPC ............... 296/146.2, 201, 96.16, 84.1, 190.1, 296/1.08, 146.9; 49/502, 490.1
See application file for complete search history.

(56) References Cited

U.S. PATENT DOCUMENTS

| | | | |
|---|---|---|---|
| 4,910,918 A * | 3/1990 | Naples et al. ................... | 49/441 |
| 5,566,510 A * | 10/1996 | Hollingshead et al. ....... | 49/479.1 |
| 5,718,084 A * | 2/1998 | Takamiya ....................... | 49/440 |
| 6,880,293 B2 * | 4/2005 | Ishikawa et al. ............... | 49/414 |
| 8,127,501 B2 * | 3/2012 | Nakao et al. .................... | 49/502 |
| 8,176,681 B2 * | 5/2012 | Tamaoki et al. ............. | 49/498.1 |
| 2011/0099912 A1 * | 5/2011 | Ohtake et al. .................. | 49/502 |
| 2012/0079772 A1 * | 4/2012 | Mine ............................ | 49/490.1 |

FOREIGN PATENT DOCUMENTS

| | | |
|---|---|---|
| JP | 4-106010 U | 9/1992 |
| JP | 2002-144882 A | 5/2002 |

OTHER PUBLICATIONS

Japanese Office Action dated Apr. 8, 2014, issued in corresponding Japanese Patent Application No. 2012-190980 with Englush summary (5 pages).

Kurokawa, Shigeaki, Japan Institute of Invention and Innovation public presentation technical report, No. 2002-49, 2002, w/machine translation.

* cited by examiner

*Primary Examiner* — Pinel Romain
(74) *Attorney, Agent, or Firm* — Westerman, Hattori, Daniels & Adrian, LLP

(57) ABSTRACT

A vehicle door includes a run channel including a molded rubber part that is molded using a mold and an extruded part that is molded by extrusion molding. A covering lip is formed on the molded rubber part in such a manner as to extend rearward from an inner side of the molded rubber part. A mounting hole is covered by the covering lip. The covering lip and an extruded lip are accommodated in a recess of a corner garnish and clamped between a flange and the corner garnish, so that the molded rubber part is strongly fixed to the upper corner of the door sash.

7 Claims, 11 Drawing Sheets

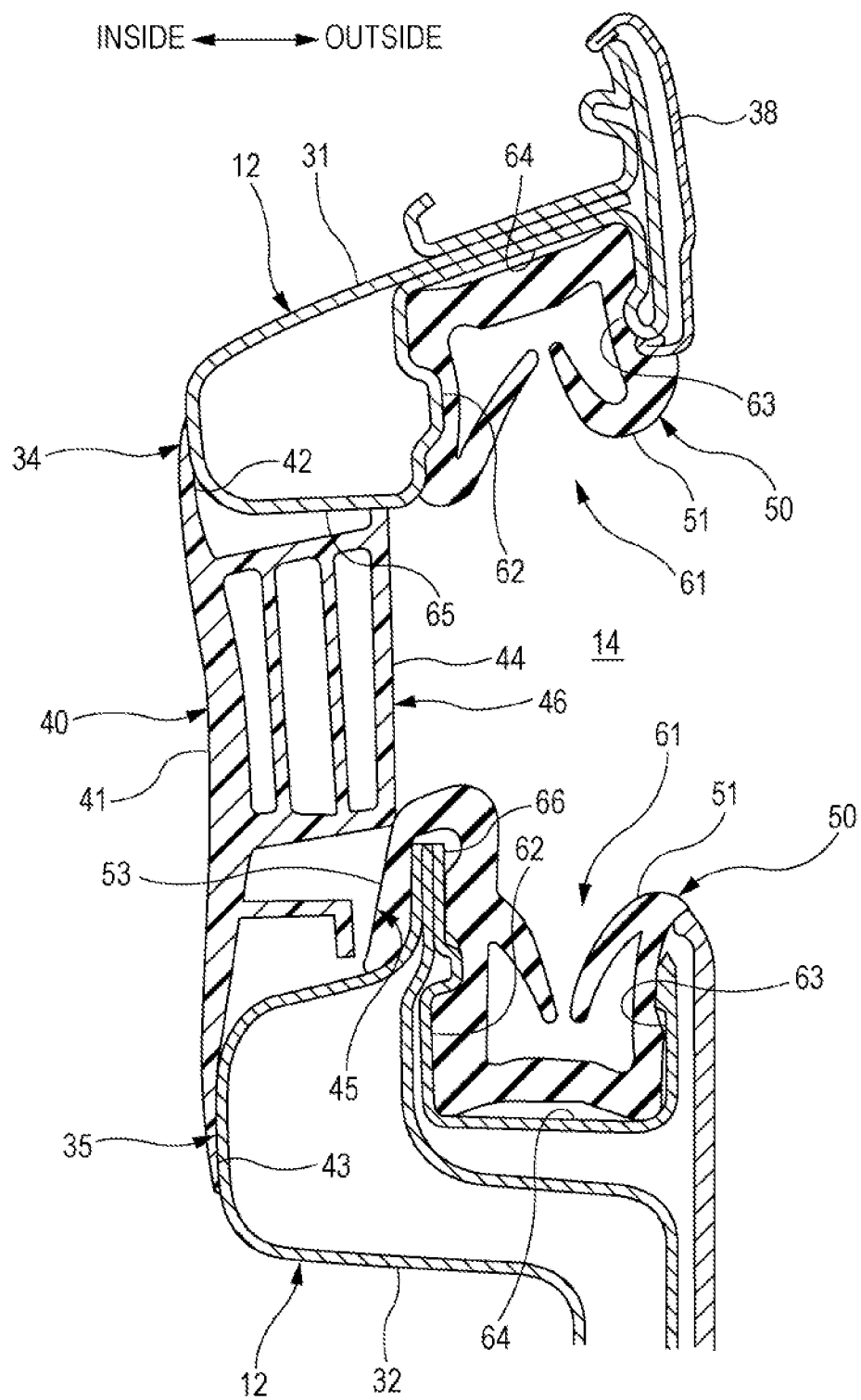

VEHICLE DOOR

CROSS REFERENCES TO RELATED APPLICATIONS

The present application claims priority under 35 U.S.C. §119 to Japanese Patent Application No. 2012-190980, filed Aug. 31, 2012, entitled "Vehicle Door." The contents of this application are incorporated herein by reference in their entirety.

TECHNICAL FIELD

The present disclosure relates to a technology for improving a door for opening and closing a door opening formed in a vehicle body.

BACKGROUND

In a vehicle door, a door sash is formed above a door main body, and there is known a technology for opening and closing a window opening surrounded by a door sash and an upper edge of a door main body by use of a door glass, (see, for example, Japan Institute of Invention and Innovation Journal of Technical Disclosure No. 2002-49).

In a vehicle door described in Japan Institute of Invention and Innovation Journal of Technical Disclosure No. 2002-49, a notch-shaped portion is formed in an upper corner portion of a door sash of the vehicle door. A corner garnish is mounted in the upper corner portion of the door sash by inserting a hook portion of the corner garnish into the notch-shaped portion. A weather strip is provided along the periphery of a door opening that is formed in a vehicle body and that is to be opened and closed by the vehicle door. When the vehicle door is closed, the vehicle door is brought into contact with the weather strip provided on the vehicle body. Since the corner garnish is disposed in the upper corner portion of the door sash, a contact portion of the weather strip with which the corner garnish is in contact may be formed in gently curve along the corner garnish. In the case where the contact portion of the weather strip is gently curved, the weather strip may be a continuous extruded member.

However, in the case where the notch-shaped portion is formed in the upper corner portion of the door sash, and the corner garnish is disposed in the upper corner portion of the door sash, the notch-shaped portion and a portion of the upper corner portion of the door sash on which the corner garnish is mounted need to be covered from the outside of a vehicle in order to improve the appearance of the upper corner portion of the door sash. In the related art, as a measure for improving the appearance, a molded rubber part that covers the entirety of a corner garnish has been formed in an upper corner portion of a run channel that guides a door glass.

However, in the case of forming a molded rubber part of a run channel having such a size that covers the entirety of a corner garnish, the molded rubber part becomes large, and the manufacturing costs increase. In contrast, in the case of simply reducing the size of a molded rubber part, a notch-shaped portion and a mounting portion of a corner garnish are likely to be seen from the outside of the vehicle.

SUMMARY

The present application describes a vehicle door that includes an upper corner of a door sash having a good appearance and a molded rubber part of a run channel of reduced size, whereby a reduction in the manufacturing costs may be achieved.

The vehicle door according to the present disclosure includes a door main body, a door sash that is provided on an upper portion of the door main body, a window opening that is surrounded by the door sash and an upper edge of the door main body, a door glass that opens and closes the window opening, and a run channel that guides the door glass. A corner garnish is disposed in an upper corner of the door sash. The door sash includes a run channel support part supporting the run channel and including an inboard side wall, an outboard side wall and a bottom wall connecting the inboard side wall and the outboard side wall such that the run channel support part has a U-shaped cross section open toward the window opening. The door sash includes a mounting hole in the upper corner thereof for receiving the corner garnish, the mounting hole being formed at a position located on an inboard side of the run channel support part. The run channel includes a covering lip in the upper corner of the door sash such that the mounting hole is located behind the covering lip when viewed from the outside of the vehicle door. The covering lip is positioned on an inboard side of the inboard side wall of the run channel support part and clamped between the inboard side wall and the corner garnish.

In the vehicle door according to the aspect, the corner garnish is arranged in the upper corner of the door sash, and the mounting hole in which the corner garnish is to be mounted is formed at a position closer to the inside of the vehicle than the run channel support part. Since the covering lip that covers the mounting hole from the outer side of the vehicle door is formed on the run channel, the appearance of the upper corner of the door sash may be improved. The covering lip that covers the mounting hole is simply formed on the run channel, and thus, it is not necessary to cover the entirety of the corner garnish. Therefore, a reduction in the manufacturing costs may be achieved by reducing the size of the molded rubber part of the run channel that is formed in the upper corner. The covering lip is positioned closer to the inside of the vehicle than the tip portion of the inboard side wall of the run channel support part and clamped between the portion of the inboard side wall and the corner garnish. Therefore, the covering lip may be prevented from falling off from the door sash. Since the covering lip does not fall off, the appearance of the upper corner of the door sash may be retained.

It is preferable that the door sash includes an upper frame and a side frame, the upper corner of the door sash is a corner portion between an end portion of an upper frame of the door sash and an upper end portion of a side frame of the door sash, one of the upper frame and the side frame includes an inner extending wall extending from a tip portion of the inboard side wall of the run channel support part toward the inboard direction, the other of the upper frame and the side frame includes a flange extending from the inboard side wall of the run channel support part along a surface direction of the vehicle door, the mounting hole is formed in the inner extending wall in the upper corner of the door sash, and the flange clamps the covering lip with the corner garnish.

In the vehicle door according to the aspect, the inner extending wall extending from the tip of the inboard side wall of the run channel support part toward the inside of the vehicle is formed in one of the upper frame and the side frame of the door sash. Simply by forming the mounting hole in which the corner garnish is to be mounted in the inner extending wall and inserting the hook portion of the corner garnish into the mounting hole, a configuration of mounting of the corner garnish may be simple. The flange is formed in the other one of the upper frame and the side frame of the door sash. The flange extends from the inboard side wall of the run channel support part in the surface direction of the vehicle door and clamps the covering lip together with the corner garnish. Since the flange is formed in the portion of the inboard side wall of the run channel support part of the other one of the upper frame and the side frame of the door sash, the door sash may easily be formed as compared with the case where the flange is formed in such a manner as to be also integrated with the one of the upper frame and the side frame of the door sash. Since the flange is formed in the other one of the upper frame and the side frame of the door sash, the mounting hole in which the corner garnish is to be mounted and which is to be formed in the one of the upper frame and the side frame of the door sash may be positioned closer to the upper corner. Therefore, an area that is to be covered may be small, and thus, the molded rubber part of the run channel that is formed in the upper corner may be further reduced in size.

It is further preferable that the corner garnish includes a first contact portion contacting one of the upper frame and the side frame and a second contact portion contacting the other one of the upper frame and the side frame. A deflection of the first contact portion caused by the contacting when the corner garnish is mounted to the door sash is set to be larger than a deflection of the second contact portion caused by the contacting when the corner garnish is mounted to the door sash.

In the vehicle door according to the aspect, the corner garnish includes a first contact portion contacting one of the upper frame and the side frame and a second contact portion contacting the other one of the upper frame and the side frame. A deflection of the first contact portion caused by the contacting when the corner garnish is mounted to the door sash is set to be larger than a deflection of the second contact portion caused by the contacting when the corner garnish is mounted to the door sash. Therefore, a larger force that presses the second contact portion against the door sash while the mounting hole serves as a fulcrum may be obtained due to the elastic action of the corner garnish at the superposition area. As a result, the second contact portion that is separated apart from the mounting hole may be prevented from coming off from the door sash to prevent gap formed between the second contact portion and the door sash, and thus, the upper corner may have a good appearance.

It is further preferable that when the corner garnish is placed on the door sash, the second contact portion and the run channel are separated from each other by a distance shorter than the deflection of the second contact portion.

In the vehicle door according to the aspect, when the corner garnish is placed on the door sash, the second contact portion and the run channel are separated from each other by a distance shorter than the deflection of the second contact portion. Therefore, an outer surface of the corner garnish facing the outside of the vehicle and locating closer to the second contact portion is pressed against the run channel in such a manner as to be in contact with the run channel. As a result, no gap is formed between the second contact portion of the corner garnish and the run channel, and thus, the upper corner may have a good appearance.

It is further preferable that the one of the upper frame and the side frame is a roll formed product, and that the other one of the upper frame and the side frame is a press formed product.

In the vehicle door according to the aspect, the one of the upper frame and the side frame is a roll formed product that may easily have a hollow cross section, and thus, the inner extending wall may easily be formed. The other one of the upper frame and the side frame is a press formed product in which the flange may easily be formed by utilizing an edge of a plate material, and thus, the flange may easily be formed in the run channel support part.

It is further preferable that a recess recessed toward an inboard direction is formed in an outboard surface of the corner garnish facing an outside of the vehicle, and the covering lip is received in the recess.

In the vehicle door according to the aspect, the recess that is recessed toward the inside of the vehicle is formed in the outer surface of the corner garnish, and the covering lip is accommodated in the recess. Therefore, the corner garnish may be positioned close to the door sash, and the size of the corner garnish in a thickness direction of the vehicle door may be reduced. In addition, no space is formed between the corner garnish and the covering lip, and thus, the corner garnish becomes more reliably integrated with the covering lip.

It is further preferable that the run channel includes a molded rubber part molded using a mold and positioned at the upper corner of the door sash and an extruded part molded by extrusion molding and positioned at a portion other than the upper corner, and an end of the extruded part is coupled to an end of the molded rubber part, the molded rubber part includes the covering lip formed thereto, the extruded part includes an extruded lip continuously connected to the covering lip, and the extruded lip is received in the recess.

In the vehicle door according to the aspect, the run channel includes the molded rubber part that is molded using a mold and positioned at the upper corner of the door sash and the extruded part that is molded by extrusion molding and positioned at a portion other than the upper corner. The covering lip is formed on the molded rubber part. The extruded lip that is connected to the covering lip is formed on the extruded part. Since the extruded lip is accommodated in the recess, the molded rubber part may be further reduced in size resulting in a further reduction of the manufacturing costs.

BRIEF DESCRIPTION OF THE DRAWINGS

The advantages of the disclosure will become apparent in the following description taken in conjunction with the following drawings.

FIG. 13 is a sectional view taken along line XIII-XIII of FIG. 3.

DETAILED DESCRIPTION

An embodiment of the present disclosure will now be described below with reference to the accompanying drawings.

Figure 1:
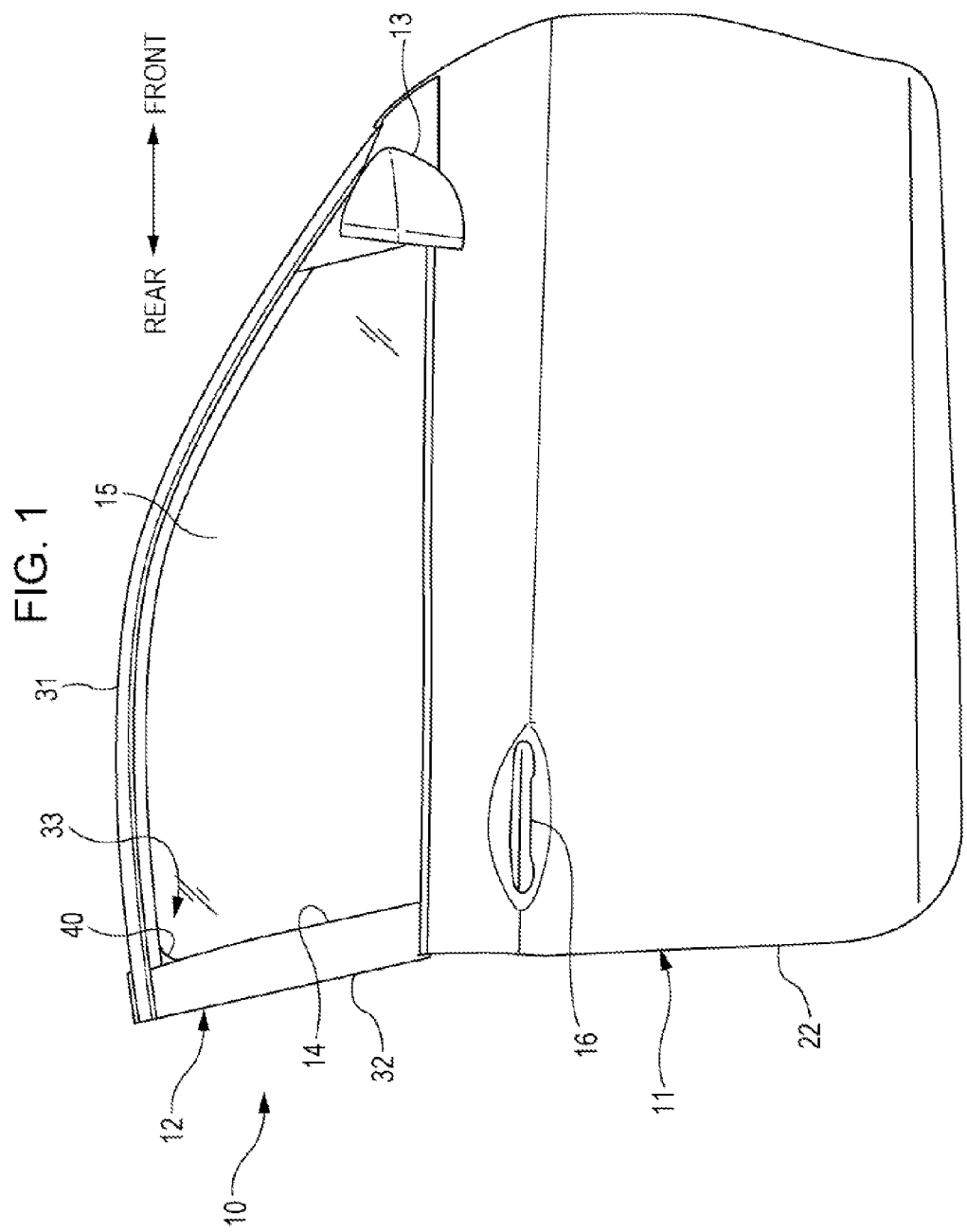
FIG. 1 is a side view of a vehicle door according to the present disclosure showing an outboard side thereof.

As illustrated in FIG. 1, a vehicle door 10 is a hinged door that is, for example, provided in a side portion of a vehicle that is on the side of a driver's seat. The vehicle door 10 includes a door main body 11 and a door sash 12 that is formed above the door main body 11.

A corner garnish 40 is disposed in an upper corner 33 of the door sash 12 between an end portion of an upper frame 31 of the door sash 12 on the rear side of the vehicle and an upper end portion of a side frame 32 of the door sash 12. The corner garnish 40 has design flexibility and thus may be seen from an area outside the vehicle.

A door mirror 13 is provided at a corner between a front upper portion of the door main body 11 and a front lower portion of the door sash 12. A door glass 15 by use of which a window opening 14 that is surrounded by the door sash 12 and an upper edge of the door main body 11 is opened and closed is provided in the window opening 14. An outer handle 16 is mounted on a rear upper portion of the door main body 11.

Figure 2:
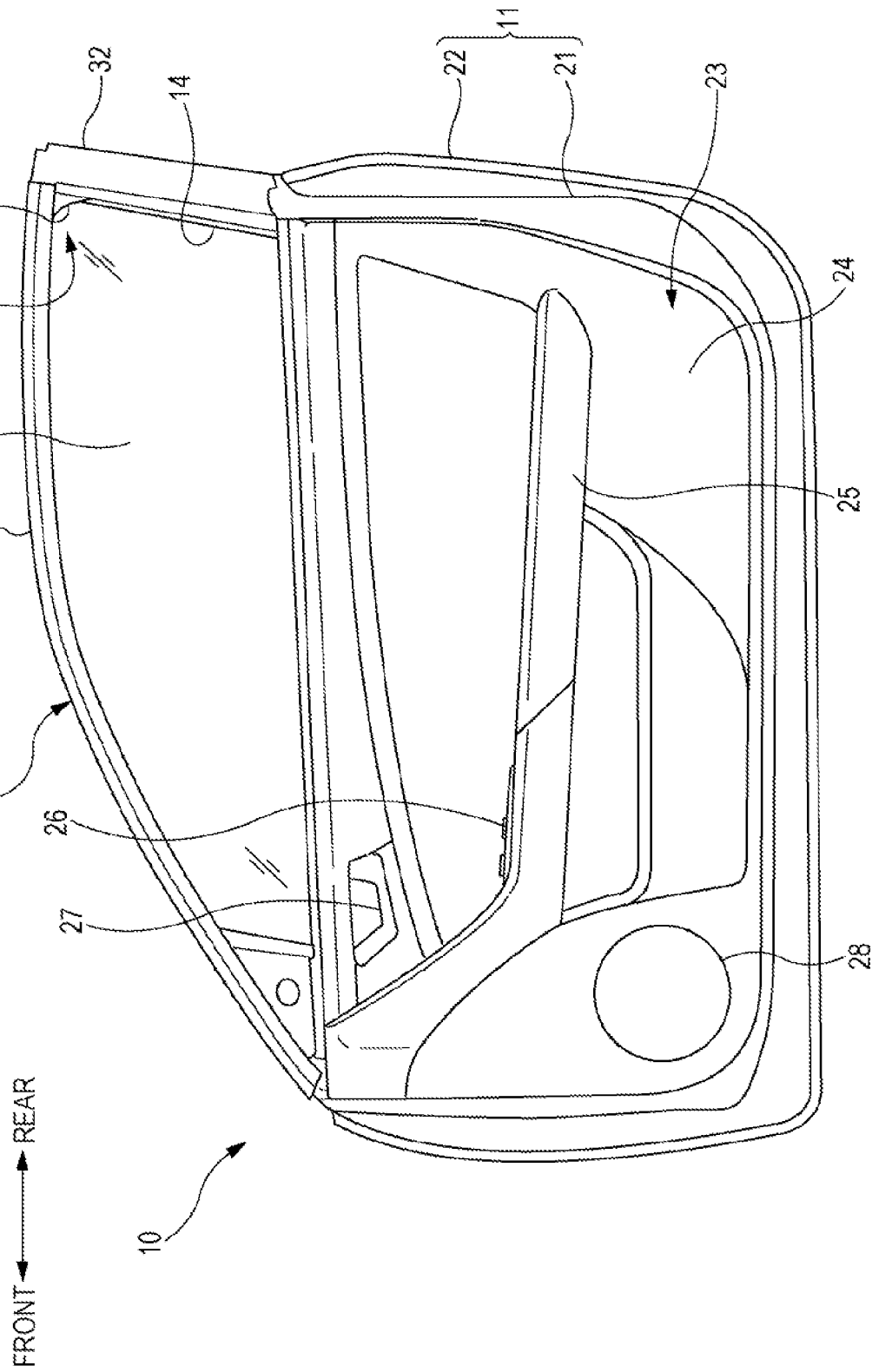
FIG. 2 is a side view of the vehicle door illustrated in FIG. 1 showing an inboard side thereof.

The vehicle door 10 will now be described with reference to a side view of the vehicle door 10 as seen from an area inside the vehicle. As illustrated in FIG. 2, the door main body 11 includes a door inner panel 21 made of a metal and a door outer panel 22 made of a metal and provided on an outer side of the door inner panel 21 facing the outside of the vehicle. A door trim 23 is provided on an inner side of the door inner panel 21 facing the area inside the vehicle.

The door trim 23 includes an armrest 25 projecting from an inner surface 24 of the door trim 23 facing the area inside the vehicle toward the side opposite to the door inner panel 21, an operation switch 26 for operating a functional component disposed within the door main body 11, an inner handle 27, and a speaker 28 provided in a front lower portion of the inner surface 24. An inner surface 41 of the corner garnish 40 facing the area inside the vehicle has design flexibility and thus may be seen from the inside of the vehicle.

Figure 3:
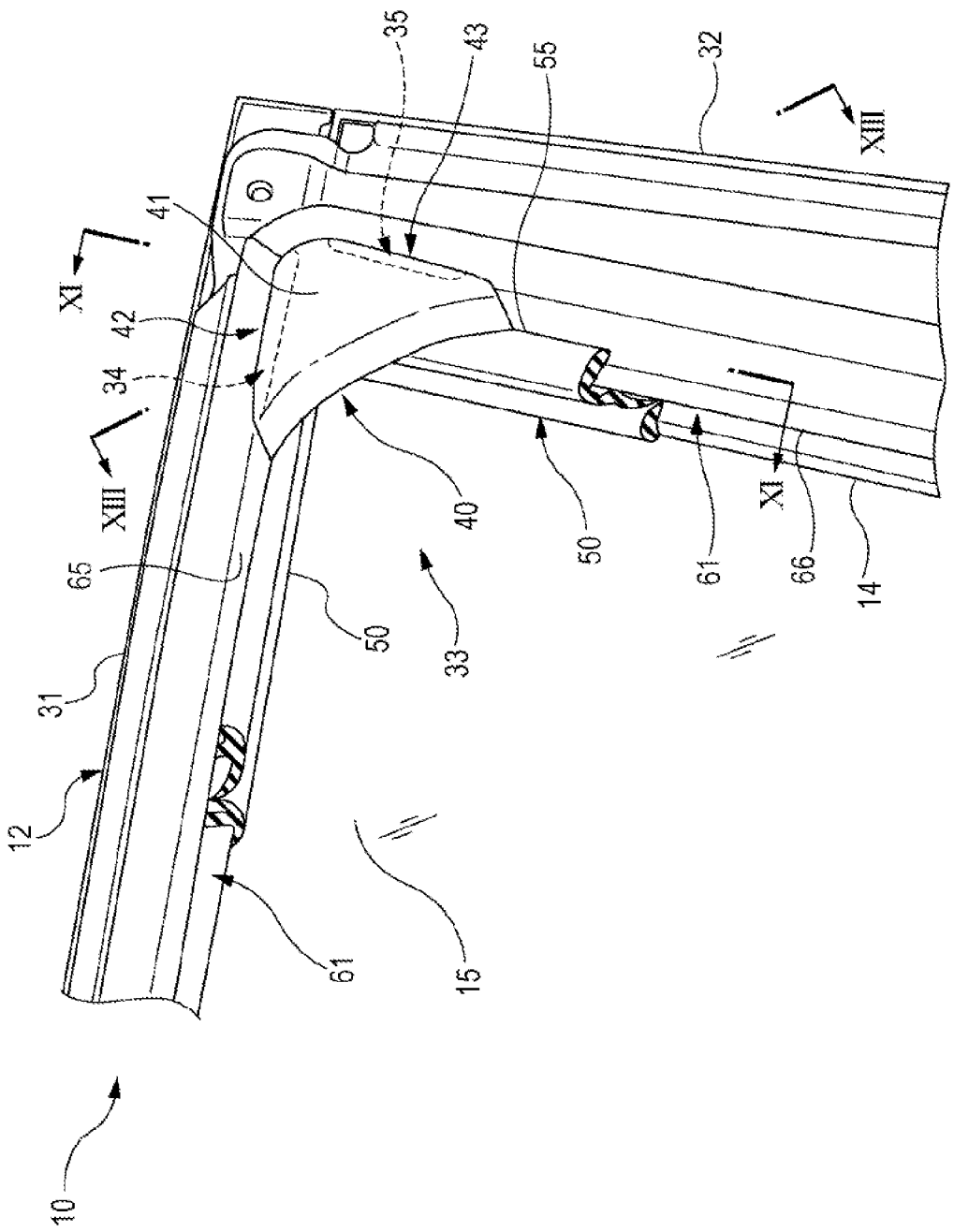
FIG. 3 is an enlarged view of a principal portion of the vehicle door according to the present disclosure showing the inboard side thereof.

The upper corner 33 will now be described with reference to a diagram of the upper corner 33 as seen from the area inside the vehicle. As illustrated in FIG. 3, in the upper corner 33, the corner garnish 40 is provided on an inner side of the door sash 12 facing the area inside the vehicle. The corner garnish 40 includes a first contact portion 42 that is in contact with the upper frame 31 and a second contact portion 43 that is in contact with the side frame 32. A superposition area 34 in which the upper frame 31 and the first contact portion 42 are superposed with each other is set to be larger than a superposition area 35 in which the side frame 32 and the second contact portion 43 are superposed with each other.

A run channel 50 that guides the door glass 15 is supported on the upper frame 31 and the side frame 32 of the door sash 12. In the door sash 12, a run channel support part 61 that supports the run channel 50 is formed to the upper frame 31 and the side frame 32 on the window opening 14 side thereof. In the upper corner 33, the run channel 50 is positioned more outside than the corner garnish 40 in a vehicle width direction.

Figure 4:
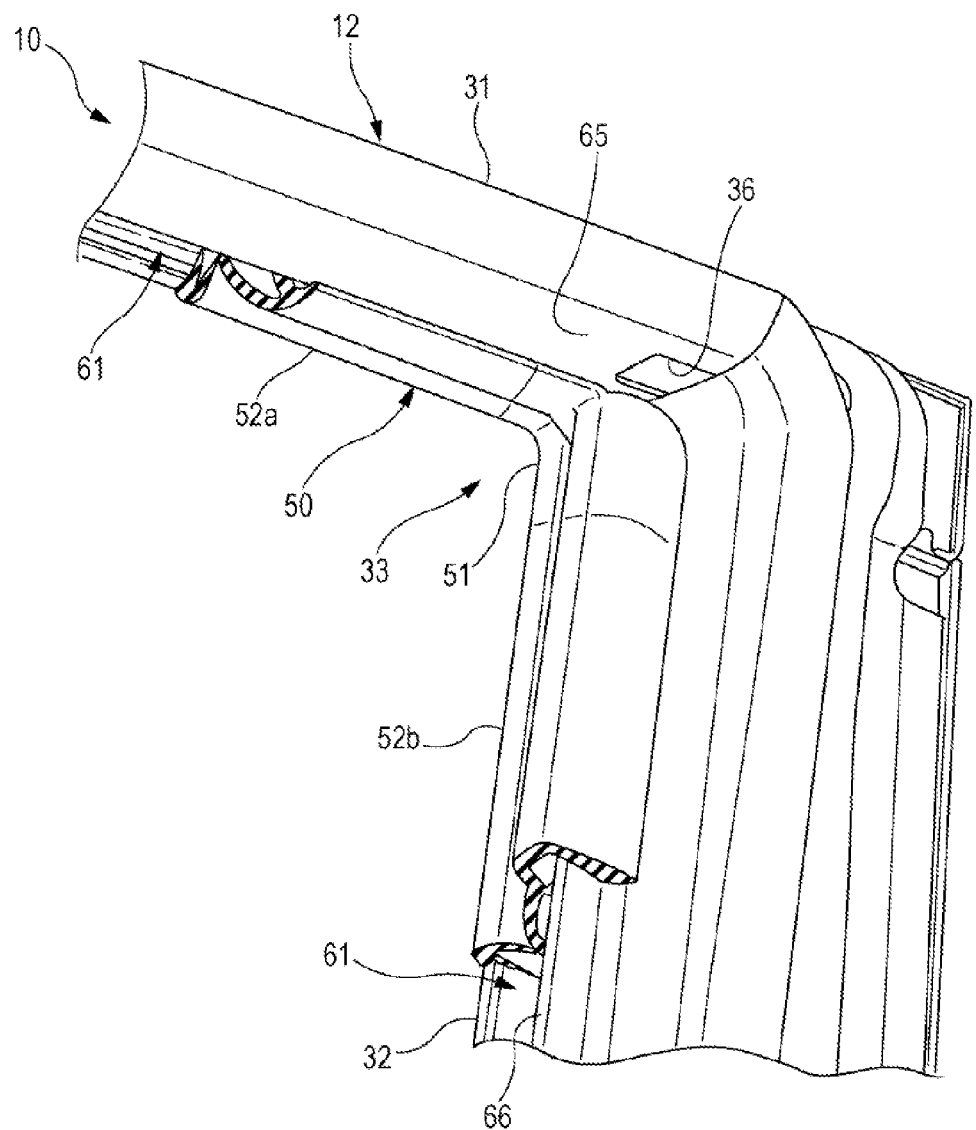
FIG. 4 is a diagram of the vehicle door illustrated in FIG. 3 without a corner garnish.

The upper corner 33 without the corner garnish 40 will now be described. As illustrated in FIG. 4, a mounting hole 36 in which the corner garnish 40 (see FIG. 3) is to be mounted is formed in the upper corner 33 of the upper frame 31 of the door sash 12. When the corner garnish 40 is mounted on the door sash 12, the mounting hole 36 is covered by the corner garnish 40 and is not seen from the area inside the vehicle. Therefore, the appearance of the upper corner 33 may be improved. The run channel 50 is arranged in the vicinity of the mounting hole 36.

The run channel 50 includes a molded rubber part 51 that is molded using a mold and positioned at the upper corner 33 and extruded parts 52a and 52b that are molded by extrusion molding and positioned at portions other than the upper corner 33. The extruded parts 52a and 52b include the extruded part 52a that is an upper part of the run channel 50 extending along the upper frame 31 and the extruded part 52b that is a side part of the run channel 50 extending along the side frame 32. The molded rubber part 51 will be described in detail later. The molded rubber part 51 and the extruded parts 52a and 52b are integrally formed.

Figure 5:
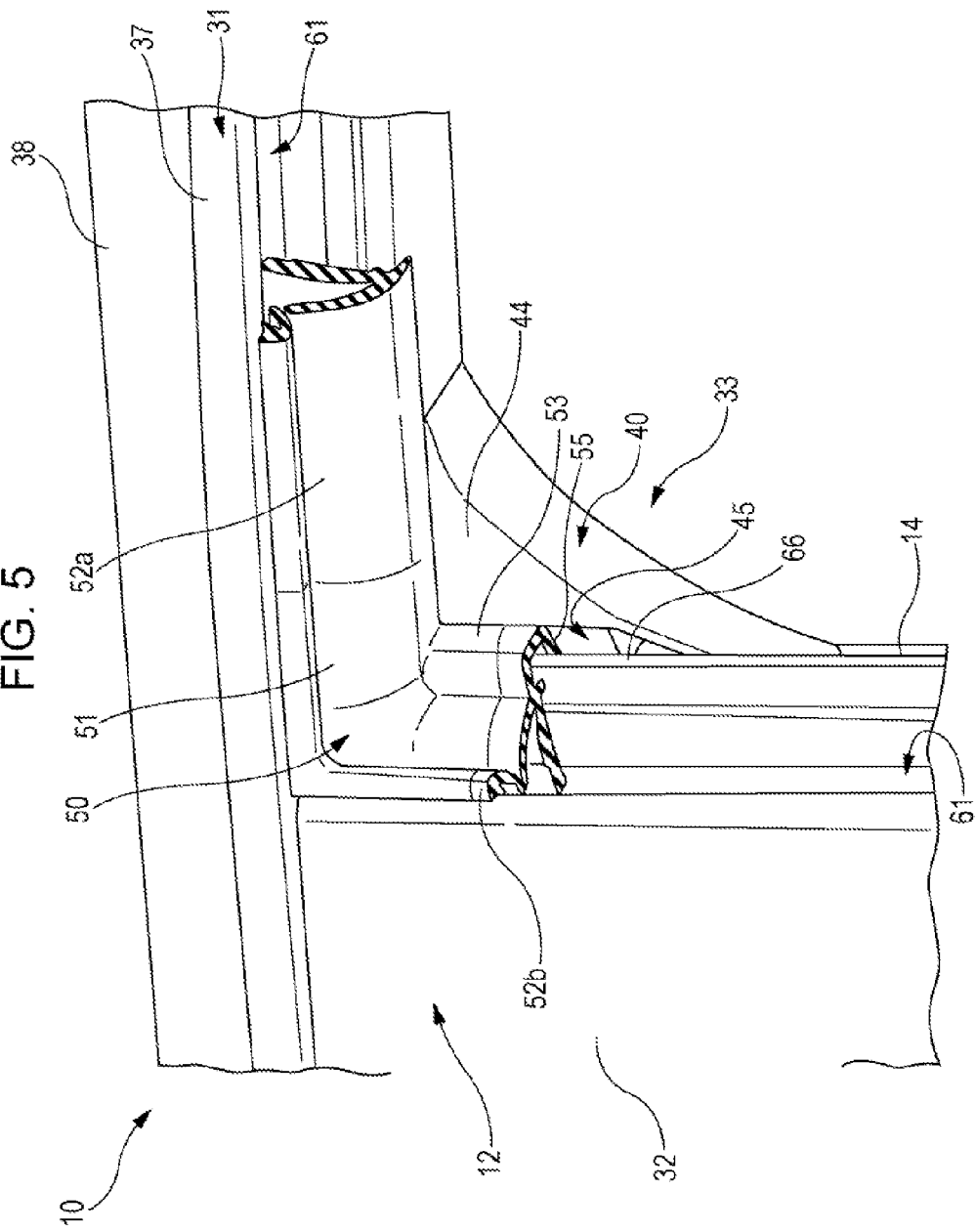
FIG. 5 is an enlarged view of the principal portion of the vehicle door according to the present disclosure showing the outboard side thereof.

The upper corner 33 will now be described with reference to a diagram of the upper corner 33 as seen from the area outside the vehicle. As illustrated in FIG. 5, a door sash molding 38 is mounted on an outer surface 37 of the upper frame 31 of the door sash 12 facing the area outside the vehicle. The run channel 50 is supported in such a manner as to be fitted into the run channel support part 61. The run channel support part 61 is formed in a groove shape, and the door glass 15 (see FIG. 1) is guided into the run channel 50 along the run channel support part 61.

A portion of the corner garnish 40 that is in contact with the door sash 12 is covered by the run channel 50. An outer surface 44 of the corner garnish 40 facing the area outside the vehicle includes a portion that is not covered by the run channel 50 and is a planar design surface. A recess 45 that is recessed toward the area inside the vehicle is formed in the outer surface 44 of the corner garnish 40. Part of the run channel 50 is accommodated in the recess 45, and the recess 45 is covered by the run channel 50.

Figure 6:
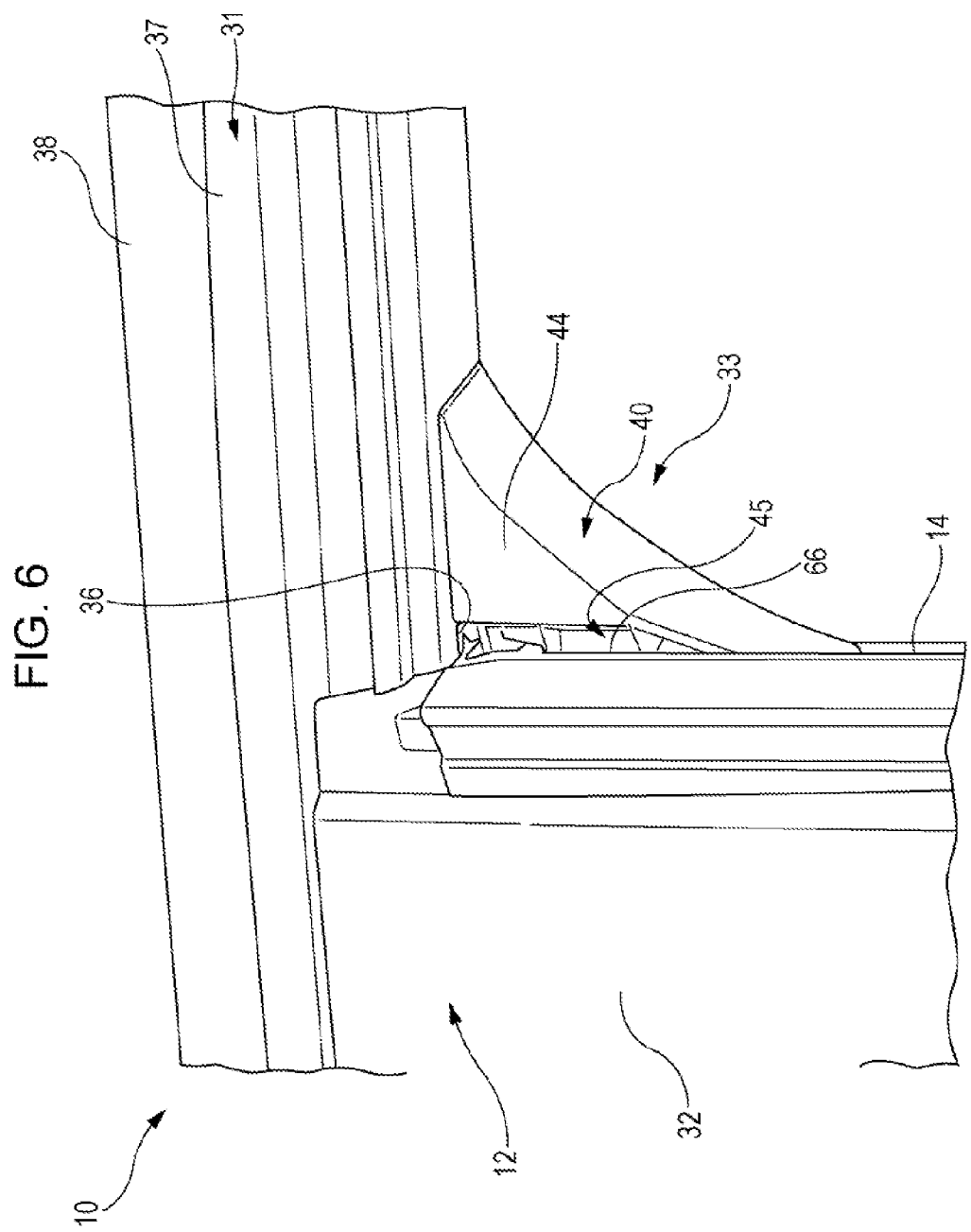
FIG. 6 is a diagram of the vehicle door illustrated in FIG. 5 without a run channel.

The upper corner 33 without the run channel 50 will now be described. As illustrated in FIG. 6, in a state where the corner garnish 40 is mounted on the door sash 12, the recess 45 extends along the side frame 32 in a top-bottom direction. Therefore, the recess 45 may be covered by the run channel 50 that is provided along the window opening 14 (see FIG. 5).

Since an upper edge of the outer surface 44 is in contact with the upper frame 31, a boundary between the outer surface 44 and the upper frame 31 may also be covered by the run channel 50. Therefore, the appearance of the upper corner 33 when viewed from the area outside the vehicle may be improved.

Figure 7:
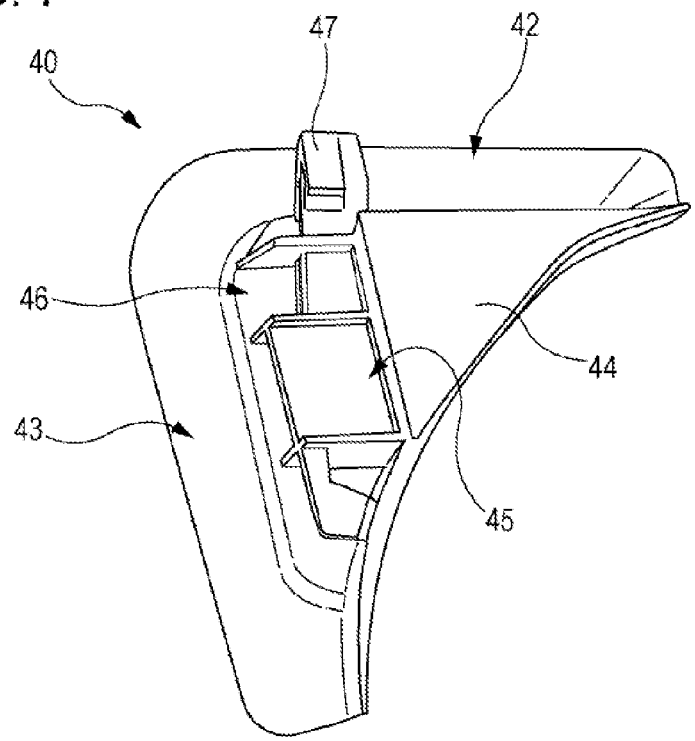
FIG. 7 is a perspective view of the corner garnish according to the present disclosure.

The corner garnish 40 will now be described in detail below. As illustrated in FIG. 7, the corner garnish 40 includes a main body 46, the inner surface 41 (see FIG. 3), the first contact portion 42, the second contact portion 43, the outer surface 44, the recess 45, and a hook portion 47. The hook portion 47 extends upward from the main body 46 as viewed in FIG. 7. The corner garnish 40 is a component that has elasticity and is made of a resin. In a natural state, the first contact portion 42 and the second contact portion 43 are slightly curved from the back side to the front side of FIG. 7.

Figure 8:
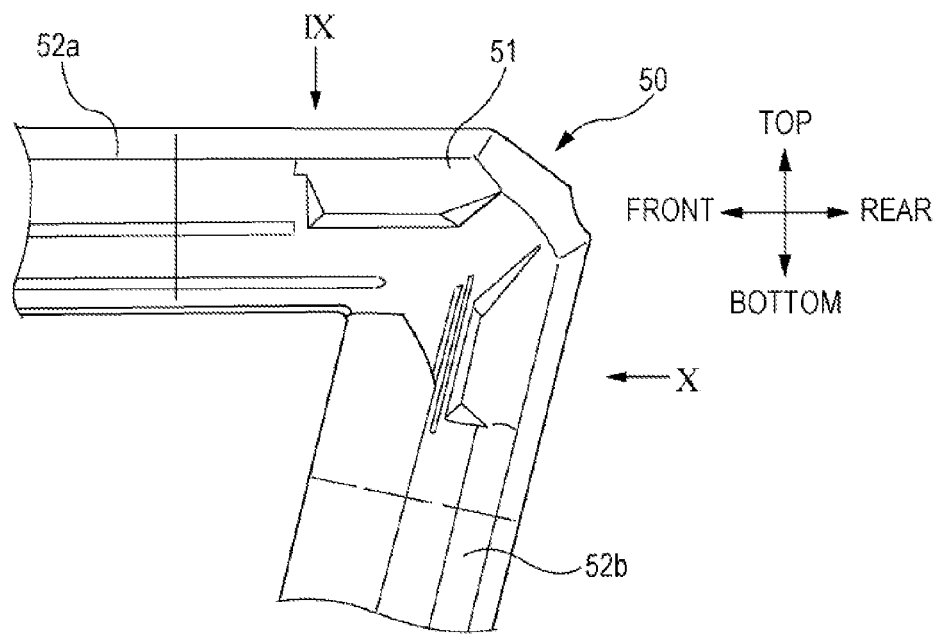
FIG. 8 is a side view of a molded rubber part according to the present disclosure.

The run channel 50 will now be described in detail below. As illustrated in FIG. 8, in the upper corner 33 (see FIG. 4), the run channel 50 includes the molded rubber part 51 that is molded using a mold and the extruded parts 52a and 52b that are molded by extrusion molding. An end of the extruded part 52a and an end of the extruded part 52b are coupled to corresponding ends of the molded rubber part 51. The molded rubber part 51 has an L-shape when viewed from the side. The extruded part 52*a* extends forward from one end of the molded rubber part 51 having an L-shape, and the extruded part 52*b* extends downward from the other end of the molded rubber part 51 having an L-shape.

Figure 9:
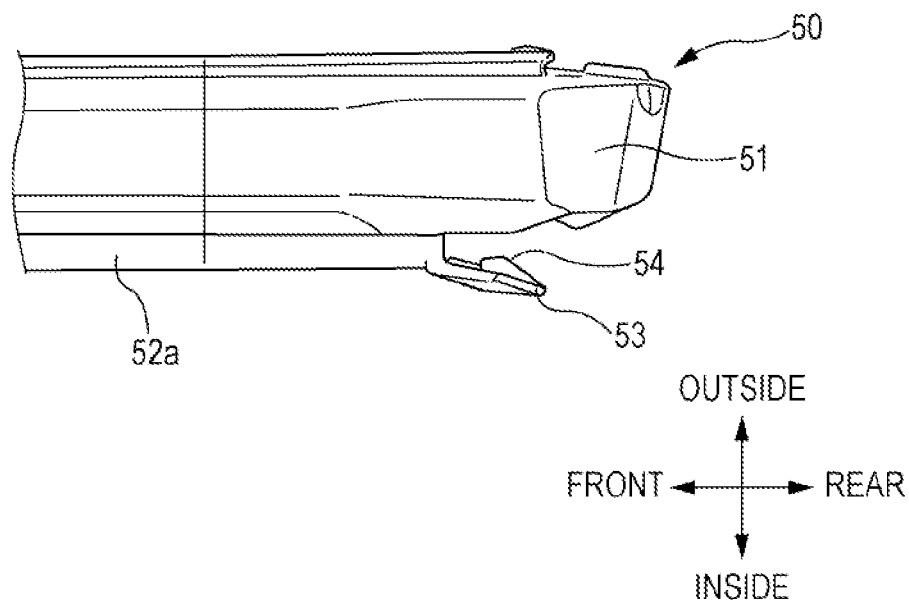
FIG. 9 is a view as seen in the direction of arrow IX of FIG. 8.

As illustrated in FIG. 9, a covering lip 53 is formed on the molded rubber part 51 in such a manner as to extend rearward from an inner side of the molded rubber part 51. A protruding portion 54 protruding toward the main body of the molded rubber part 51 is formed on a tip portion of the covering lip 53.

Figure 10:
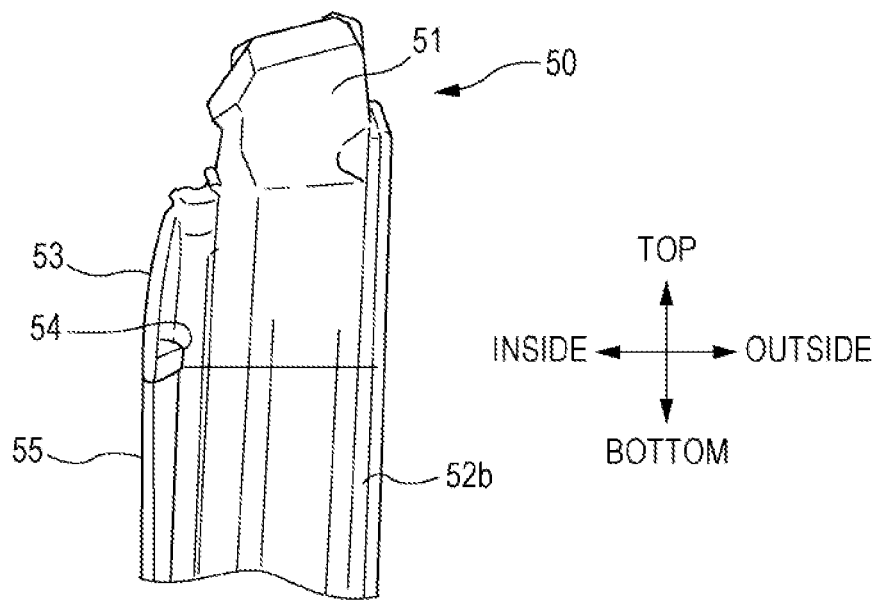
FIG. 10 is a view as seen in the direction of arrow X of FIG. 8.

As illustrated in FIG. 10, an extruded lip 55 that is connected to the covering lip 53 is formed on the extruded part 52*b*. The extruded part 52*b* is connected to the molded rubber part 51 without steps. As illustrated in FIG. 5, the outer surface 44 of the corner garnish 40 may be seen from the area outside the vehicle, and the corner garnish 40 is not entirely covered by the molded rubber part 51. Therefore, the molded rubber part 51 may be reduced in size. The molded rubber part 51 is a component that is molded using a mold. As the molded rubber part 51 becomes larger, the molded rubber part 51 becomes more expensive. In contrast, the component costs may be reduced by reducing the size of the molded rubber part 51.

Figure 11:
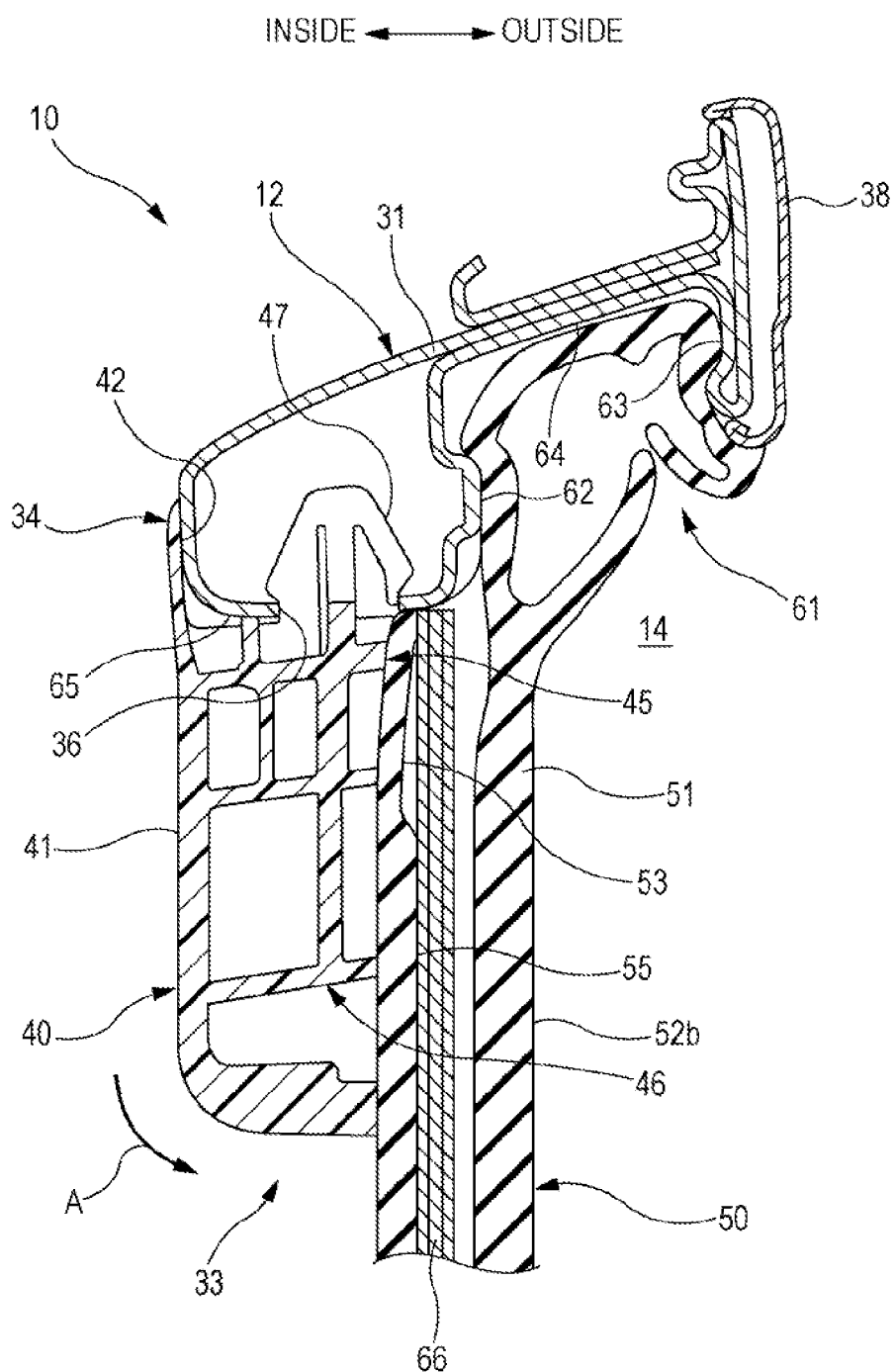
FIG. 11 is a sectional view taken along line XI-XI of FIG. 3.

The upper corner 33 with the corner garnish 40 being mounted thereon will now be described with reference to a sectional view of the upper corner 33. As illustrated in FIG. 11, the run channel support part 61 of the door sash 12 has a U-shaped cross section formed in such a manner as to be open toward the window opening 14. The run channel support part 61 includes an inboard side wall 62, an outboard side wall 63, and a bottom wall 64 connecting the outboard side wall 63 and the inboard side wall 62. The run channel 50 is mounted on the door sash 12 by being fitted into the run channel support part 61, which has a U-shaped cross section.

An inner extending wall 65 extending from a tip of the side wall 62 toward the area inside the vehicle is formed in the upper frame 31 of the door sash 12. The mounting hole 36 is formed in the inner extending wall 65.

Figure 12:
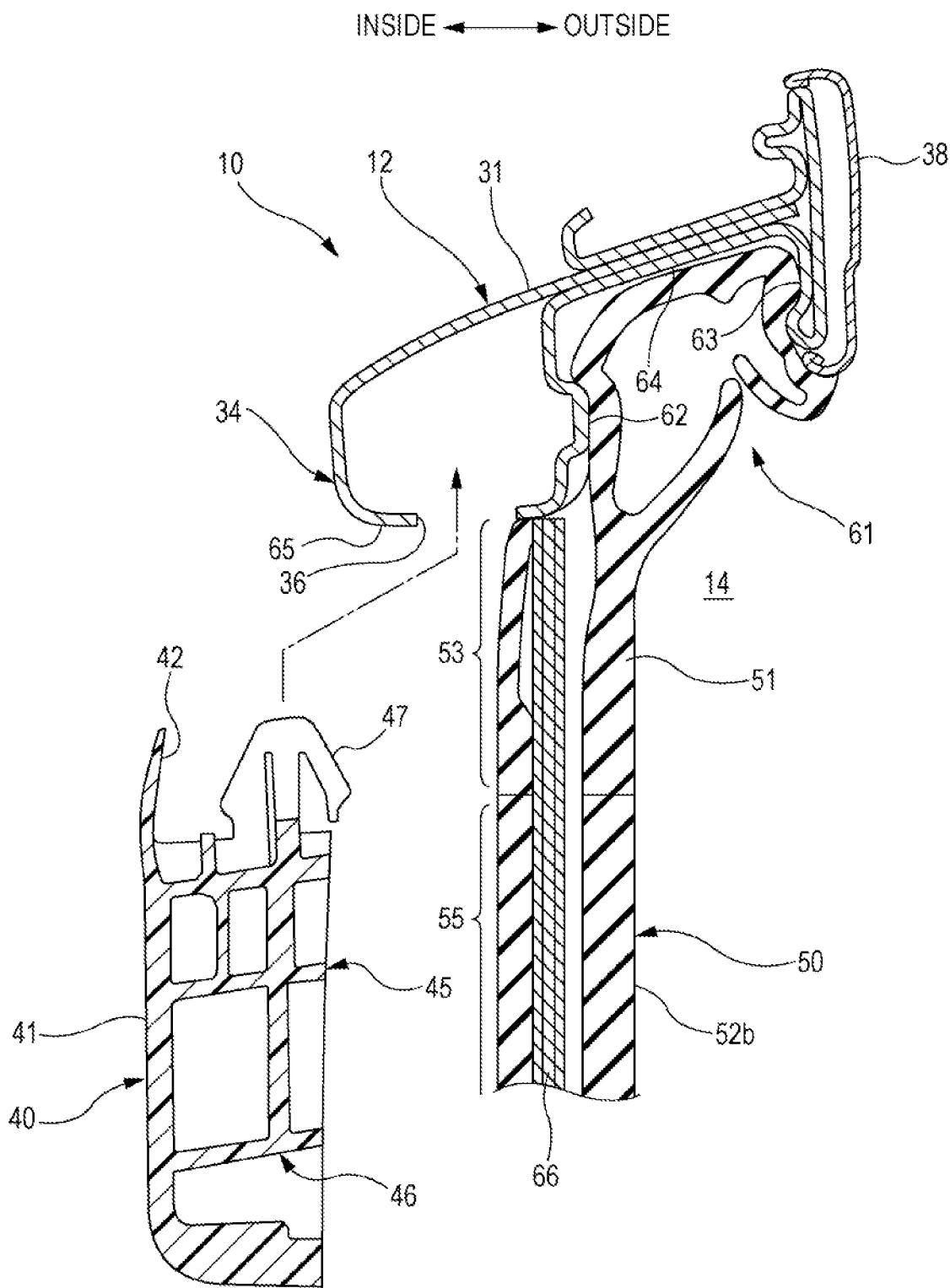
FIG. 12 is an exploded view of FIG. 11.

The mounting of the corner garnish 40 onto the door sash 12 will now be described. As illustrated in FIG. 12, the corner garnish 40 is mounted on the door sash 12 by inserting the hook portion 47 of the corner garnish 40 into the mounting hole 36 of the door sash 12 in such a manner as indicated by an arrow in FIG. 12.

In a natural state, the first contact portion 42 of the corner garnish 40 is curved toward the hook portion 47 along the direction extending from the base end to the tip end thereof. When the corner garnish 40 is mounted on the door sash 12, the first contact portion 42 is pressed against the superposition area 34 on one side of the door sash 12.

Returning to FIG. 11, when the first contact portion 42 is pressed against the superposition area 34 of the door sash 12, the corner garnish 40 receives a force that acts in the direction of arrow A in FIG. 11 while the mounting hole 36 serves as a fulcrum due to the elastic action of the superposition area 34. Therefore, the second contact portion 43 of the corner garnish 40 (see FIG. 3) is pressed against the side frame 32 of the door sash 12 (see FIG. 3). As a result, the corner garnish 40 may be brought into close contact with the door sash 12, and thus, the appearance of the upper corner 33 may be improved.

The covering lip 53 in a mounted state will now be described with reference to a sectional view of the upper corner 33. As illustrated in FIG. 13, a flange 66 extending from the run channel support part 61 in a surface direction of the vehicle door 10 is formed in the side frame 32 of the door sash 12. The flange 66 includes a portion of the inboard side wall 62 and extends from the side wall 62 toward the window opening 14.

The covering lip 53 is positioned on the inner side of the flange 66 and clamped between the flange 66 and the corner garnish 40. More specifically, the covering lip 53 is accommodated in the recess 45 of the corner garnish 40. The extruded lip 55 that is connected to the covering lip 53 (see FIG. 11) is also accommodated in the recess 45.

The upper frame 31 of the door sash 12 is a roll formed product. Therefore, the inner extending wall 65 may easily be molded. The side frame 32 of the door sash 12 is a press formed product. Therefore, the flange 66 may easily be molded.

The second contact portion 43 and the run channel 50 are separated from each other by a distance shorter than the a deflection of the second contact portion 43 at the superposition area 35 of the door sash 12 illustrated in FIG. 3. The second contact portion 43 is pressed against the side frame 32. As a result, there is no space between the second contact portion 43 and the side frame 32, and thus, the appearance of the upper corner 33 may be improved.

Returning to FIG. 5, the mounting hole 36 (see FIG. 4) is covered by the covering lip 53, and thus, the appearance of the upper corner 33 may be improved. The covering lip 53 and the extruded lip 55 are accommodated in the recess 45 of the corner garnish 40 and clamped between the flange 66 and the corner garnish 40, so that the molded rubber part 51 is strongly fixed to the upper corner 33 of the door sash 12. In addition, the protruding portion 54 of the covering lip 53 (see, FIG. 9) is hooked into the recess 45, so that the molded rubber part 51 is further strongly fixed to the upper corner 33 of the door sash 12.

The vehicle door 10 described above is summarized as follows.

As illustrated in FIGS. 4 and 5, the corner garnish 40 is arranged in the upper corner 33 of the door sash 12, and the mounting hole 36 in which the corner garnish 40 is to be mounted is formed at a position closer to the inside of the vehicle door 10 than the run channel support part 61. Since the covering lip 53 that covers the mounting hole 36 from the outside of the vehicle door 10 is formed on the run channel 50, the appearance of the upper corner 33 of the door sash 12 may be improved. The covering lip 53 that covers the mounting hole 36 is simply formed on the run channel 50, and thus, it is not necessary to cover the entirety of the corner garnish 40. Therefore, a reduction in the manufacturing costs may be achieved by reducing the size of the molded rubber part 51 of the run channel 50 that is formed in the upper corner 33. The covering lip 53 is positioned closer to the inside of the vehicle door 10 than the tip portion of the side wall 62 of the run channel support part 61 and clamped between the portion of the side wall 62 and the corner garnish 40. Therefore, the covering lip 53 may be prevented from falling off from the door sash 12. Since the covering lip 53 does not fall off, the appearance of the upper corner 33 of the door sash 12 may be retained.

As illustrated in FIGS. 4, 11, and 13, the inner extending wall 65 extending from the tip of the side wall 62 of the run channel support part 61 toward the inside of the vehicle is formed in one of the upper frame 31 and the side frame 32 of the door sash 12. Simply by forming the mounting hole 36 in which the corner garnish 40 is to be mounted in the inner extending wall 65 and inserting the hook portion 47 of the corner garnish 40 into the mounting hole 36, the configuration of the mounting of the corner garnish 40 may be simpler. The flange 66 is formed in the other one of the upper frame 31 and the side frame 32 of the door sash 12. The flange 66 extends from the side wall 62 of the run channel support part 61 in the surface direction of the vehicle door 10 and clamps the covering lip 53 together with the corner garnish 40. Since the flange 66 is formed in the portion of the side wall 62 of the run channel support part 61 of the other one of the upper frame 31 and the side frame 32 of the door sash 12, the door sash 12 may easily be formed as compared with the case where the flange 66 is formed in such a manner as to be also integrated with the one of the upper frame 31 and the side frame 32 of the door sash 12. The flange 66 is formed in the other one of the upper frame 31 and the side frame 32 of the door sash 12, and thus, the mounting hole 36 in which the corner garnish 40 is to be mounted and which is to be formed in the one of the upper frame 31 and the side frame 32 of the door sash 12 may be positioned closer to the upper corner 33. Therefore, an area that is to be covered may become smaller, and thus, the molded rubber part 51 of the run channel 50 that is formed in the upper corner 33 may be further reduced in size.

As illustrated in FIGS. 3 and 11, the corner garnish 40 includes the first contact portion 42 that is in contact with the one of the upper frame 31 and the side frame 32 and the second contact portion 43 that is in contact with the other one of the upper frame 31 and the side frame 32. A deflection of the first contact portion 42 caused by the contacting when the corner garnish is mounted to the door sash is set to be larger than a deflection of the second contact portion 43 caused by the contacting when the corner garnish is mounted to the door sash. Therefore, a larger force that presses the second contact portion 43 against the door sash 12 while the mounting hole 36 serves as a fulcrum may be obtained due to the elastic action of the corner garnish 40 at the superposition area 34. As a result, the second contact portion 43 that is separated apart from the mounting hole 36 may be prevented from coming off from the door sash 12 to prevent space formed between the second contact portion 43 and the door sash 12, and thus, the upper corner 33 may have a good appearance.

As illustrated in FIGS. 3 and 11, when the corner garnish 40 is placed on the door sash 12, the second contact portion 43 and the run channel 50 are separated from each other by the distance shorter than the deflection of the second contact portion 43. Therefore, the outer surface 44 of the corner garnish 40 closer to the second contact portion 43 is pressed against the run channel 50 in such a manner as to be in contact with the run channel 50. As a result, no space is formed between the second contact portion 43 of the corner garnish 40 and the run channel 50, and thus, the upper corner 33 may have a good appearance.

As illustrated in FIG. 13, the one of the upper frame 31 and the side frame 32 is a roll formed product that may easily have a hollow cross section, and thus, the inner extending wall 65 may easily be formed. The other one of the upper frame 31 and the side frame 32 is a press formed product in which the flange 66 may easily be formed by utilizing an edge of a plate material, and thus, the flange 66 may easily be formed in the run channel support part 61.

As illustrated in FIG. 5, the recess 45 that is recessed toward the area inside the vehicle is formed in the outer surface 44 of the corner garnish 40, and the covering lip 53 is accommodated in the recess 45. Therefore, the corner garnish 40 may be positioned close to the door sash 12, and the size of the corner garnish 40 in the thickness direction of the vehicle door 10 may be reduced. In addition, no space is formed between the corner garnish 40 and the covering lip 53, and thus, the corner garnish 40 may have further integrated appearance with the covering lip 53.

As illustrated in FIG. 5, the run channel 50 includes the molded rubber part 51 that is molded using a mold and positioned at the upper corner 33 of the door sash 12 and the extruded parts 52a and 52b that are molded by extrusion molding and positioned at portions other than the upper corner 33. The covering lip 53 is formed on the molded rubber part 51. The extruded lip 55 that is connected to the covering lip 53 is formed on the extruded part 52b. Since the extruded lip 55 is accommodated in the recess 45, the molded rubber part 51 may be further reduced in size resulting in a further reduction of the manufacturing costs.

The scope of the disclosure is not limited to the foregoing embodiment, and various design changes can be made without departing from the scope of the disclosure. In the above embodiment, the inner extending wall 65 and the mounting hole 36 are formed in the upper frame 31 of the door sash 12, and the flange 66 is formed in the side frame 32 of the door sash 12. However, the present disclosure is not limited to the above-described embodiment. The flange 66 may be formed in the upper frame 31, the inner extending wall 65 and the mounting hole 36 may be formed in the side frame 32, and the corner garnish 40 may be mounted on the side frame 32.

The technology according to the present disclosure is suitable for a vehicle door that has a run channel that guides a door glass.

I claim:
1. A vehicle door comprising:
a door main body;
a door sash provided above the door main body and including an upper frame and a side frame, the door sash and an upper edge of the door main body surrounding a window opening;
a door glass opening and closing the window opening;
a run channel provided to the door sash and guiding the door glass;
a corner garnish disposed in an upper corner of the door sash between an upper end portion of the side frame of the door sash an end portion of the upper frame of the door sash;
wherein the door sash includes a run channel support part supporting the run channel and including an inboard side wall, an outboard side wall and a bottom wall connecting the inboard side wall and the outboard side wall such that the run channel support part has a U-shaped cross section open toward the window opening,
wherein the door sash includes a mounting hole in the upper corner thereof for receiving the corner garnish, the mounting hole being formed at a position located on an inboard side of the run channel support part,
wherein one of the upper frame and the side frame includes an inner extending wall extending from a tip portion of the inboard side wall of the run channel support part toward the inboard direction, the mounting hole being disposed in the inner extending wall,
wherein the run channel includes a covering lip in the upper corner of the door sash such that the mounting hole is located behind the covering lip when viewed from the outside of the vehicle door, and
wherein the covering lip is positioned on an inboard side of the inboard side wall of the run channel support part and on an outboard side of the mounting hole, and clamped between the inboard side wall and the corner garnish.
2. The vehicle door according to claim 1,
wherein the other of the upper frame and the side frame includes a flange extending from the inboard side wall of the run channel support part along a surface direction of the vehicle door, and
wherein the flange clamps the covering lip with the corner garnish.

3. The vehicle door according to claim 2,
wherein the corner garnish includes a first contact portion contacting one of the upper frame and the side frame and a second contact portion contacting the other one of the upper frame and the side frame, and
wherein a deflection of the first contact portion caused by the contacting when the corner garnish is mounted to the door sash is set to be larger than a deflection of the second contact portion caused by the contacting when the corner garnish is mounted to the door sash.

4. The vehicle door according to claim 3,
wherein, when the corner garnish is placed on the door sash, the second contact portion and the run channel are separated from each other by a distance shorter than the deflection of the second contact portion.

5. The vehicle door according to claim 2,
wherein the one of the upper frame and the side frame is a roll formed product, and
wherein the other one of the upper frame and the side frame is a press formed product.

6. The vehicle door according to claim 1,
wherein a recess recessed toward an inboard direction is formed in an outboard surface of the corner garnish facing an outside of the vehicle, and
wherein the covering lip is received in the recess.

7. The vehicle door according to claim 6,
wherein the run channel includes:
a molded rubber part molded using a mold and positioned at the upper corner of the door sash and an extruded part molded by extrusion molding and positioned at a portion other than the upper corner,
wherein an end of the extruded part is coupled to an end of the molded rubber part,
wherein the molded rubber part includes the covering lip formed thereto,
wherein the extruded part includes an extruded lip continuously connected to the covering lip, and
wherein the extruded lip is received in the recess.

* * * * *